US008285640B2

(12) United States Patent
Scipioni

(10) Patent No.: US 8,285,640 B2
(45) Date of Patent: Oct. 9, 2012

(54) SYSTEM AND METHODS FOR FACILITATING FUND TRANSFERS OVER A NETWORK

(75) Inventor: Germán Scipioni, San Jose, CA (US)

(73) Assignee: eBay, Inc., San Jose, CA (US)

( * ) Notice: Subject to any disclaimer, the term of this patent is extended or adjusted under 35 U.S.C. 154(b) by 252 days.

(21) Appl. No.: 12/415,669

(22) Filed: Mar. 31, 2009

(65) Prior Publication Data

US 2010/0023450 A1    Jan. 28, 2010

Related U.S. Application Data

(60) Provisional application No. 61/083,004, filed on Jul. 23, 2008.

(51) Int. Cl.
*G06Q 40/00* (2012.01)
*G06Q 20/00* (2012.01)
(52) U.S. Cl. ............... 705/39; 705/40; 705/42; 705/35
(58) Field of Classification Search ............ 705/39
See application file for complete search history.

(56) References Cited

U.S. PATENT DOCUMENTS

| | | | |
|---|---|---|---|
| 6,182,131 B1 * | 1/2001 | Dean et al. | 709/222 |
| 6,876,979 B2 * | 4/2005 | Ling | 705/26.41 |
| 7,089,208 B1 * | 8/2006 | Levchin et al. | 705/39 |
| 7,120,608 B1 * | 10/2006 | Gallagher et al. | 705/68 |
| 7,191,151 B1 * | 3/2007 | Nosek | 705/39 |
| 7,243,082 B1 * | 7/2007 | Forlai | 705/37 |
| 7,457,778 B2 * | 11/2008 | Li et al. | 705/39 |
| 7,756,780 B2 * | 7/2010 | Drummond et al. | 705/38 |
| 2003/0080185 A1 * | 5/2003 | Werther | 235/380 |
| 2003/0163418 A1 * | 8/2003 | Marks | 705/39 |
| 2004/0260565 A1 * | 12/2004 | Zimniewicz et al. | 705/1 |
| 2005/0131839 A1 * | 6/2005 | Cordery et al. | 705/78 |
| 2006/0064379 A1 * | 3/2006 | Doran et al. | 705/42 |
| 2006/0253340 A1 * | 11/2006 | Levchin et al. | 705/26 |
| 2007/0136167 A1 * | 6/2007 | Dilip et al. | 705/35 |
| 2007/0136168 A1 * | 6/2007 | Dilip et al. | 705/35 |
| 2008/0301037 A1 * | 12/2008 | Monk | 705/38 |
| 2008/0319899 A1 * | 12/2008 | Levchin et al. | 705/39 |
| 2010/0010932 A1 * | 1/2010 | Law et al. | 705/42 |

FOREIGN PATENT DOCUMENTS

JP        2001-282996 A   * 12/2001

* cited by examiner

*Primary Examiner* — Elizabeth Rosen
*Assistant Examiner* — Joan Goodbody
(74) *Attorney, Agent, or Firm* — Haynes and Boone, LLP

(57) ABSTRACT

In accordance with embodiments of the present disclosure, systems and methods for facilitating financial transactions over a network include communicating with a financial institution over the network, wherein the financial institution includes a first user account related to a user. The systems and methods include receiving a fund transfer request from the financial institution on behalf of the user and establishing a second user account related to the user based on user information passed with the fund transfer request. The systems and methods include processing the fund transfer request by linking the first user account to the second user account based on the user information passed with the fund transfer request, receiving funds from the financial institution associated with the first user account, and depositing the received funds in the second user account on behalf of the user.

17 Claims, 4 Drawing Sheets

SYSTEM AND METHODS FOR FACILITATING FUND TRANSFERS OVER A NETWORK

CROSS-REFERENCE TO RELATED APPLICATIONS

This application claims priority to and benefit of U.S. Provisional Patent Application Ser. No. 61/083,004, filed on Jul. 23, 2008, the contents of which are hereby incorporated by reference in their entirety.

BACKGROUND

1. Technical Field

The present invention generally relates to network transactions and, more particularly, to facilitating fund transfers over a network.

2. Related Art

In electronic banking and commerce, a user typically accesses accounts and conducts financial transactions through electronic communications with online service providers over communication networks, such as the Internet. Typically, when potential users sign up or use a service for processing payments and fund transfers through the Internet, the user steps through a series of steps to verify identity and a funding source. These steps ensure that funds being transferred out of or into an account is indeed an account associated with the user and not an unauthorized account.

Conventional techniques include inputting and verifying user provided information, such as account numbers, routing information, and billing address, which can often be cumbersome and time-consuming for the user. These conventional techniques may include the user typing in bank information, such as an account number and a routing number. In one instance, the online service provider may deposit a small amount of funds (e.g., 2 cents) into the user's bank account, typically a few days after the information is entered. The user then periodically checks the user's account to verify whether any small deposits have been received. Once received, the user accesses the online service provider to confirm the deposit to the account.

Unfortunately, these conventional techniques are time consuming and effort intensive and typically require the user to perform several steps and navigation events for deposit verification and settlement. As such, there currently exists a need to improve a user's experience during financial transactions including fund transfers over a network.

SUMMARY

In accordance with one or more embodiments of the present disclosure, systems and methods presented herein facilitate transactions over a network including fund transfers. In one embodiment, a method for facilitating financial transactions including fund transfers over a network includes communicating with a financial institution over the network, wherein the financial institution includes a first user account related to a user. The method includes receiving a fund transfer request from the financial institution on behalf of the user and establishing a second user account related to the user based on user information passed with the fund transfer request. The method includes processing the fund transfer request by linking the first user account to the second user account based on the user information passed with the fund transfer request, receiving funds from the financial institution associated with the first user account, and depositing the received funds in the second user account on behalf of the user, wherein the user information includes an e-mail address related to the user.

In various implementations, the method may include determining whether the user is an existing user having the second user account and verifying the identity of the user based on the user information passed with the fund transfer request. The method may include storing the second user account related to the user, wherein the user account includes information related to the user. The method may include obtaining recipient information of a recipient from the fund transfer request as provided by the user, establishing a recipient account related to the recipient based on the recipient information passed with the fund transfer request, and processing the fund transfer request by receiving funds from the financial institution associated with the first user account and depositing the received funds in the recipient account on behalf of the user. The method may include determining whether the recipient is an existing recipient having the recipient account and verifying the identity of the recipient based on the recipient information passed with the fund transfer request. The method may include storing the recipient account related to the recipient, wherein the recipient account includes information related to the recipient.

In various implementations, communicating with the financial institution over the network may comprise communicating with a bill payment service associated with the financial institution and receiving the fund transfer request from the financial institution may comprise receiving the fund transfer request from the bill payment service on behalf of the user. The financial institution may comprise a server adapted to communicate with the network, and the method may be performed by a server adapted to communicate with the financial institution over the network.

These and other features and advantages of the present disclosure will be more readily apparent from the detailed description of the embodiments set forth below taken in conjunction with the accompanying drawings.

Figure 1:
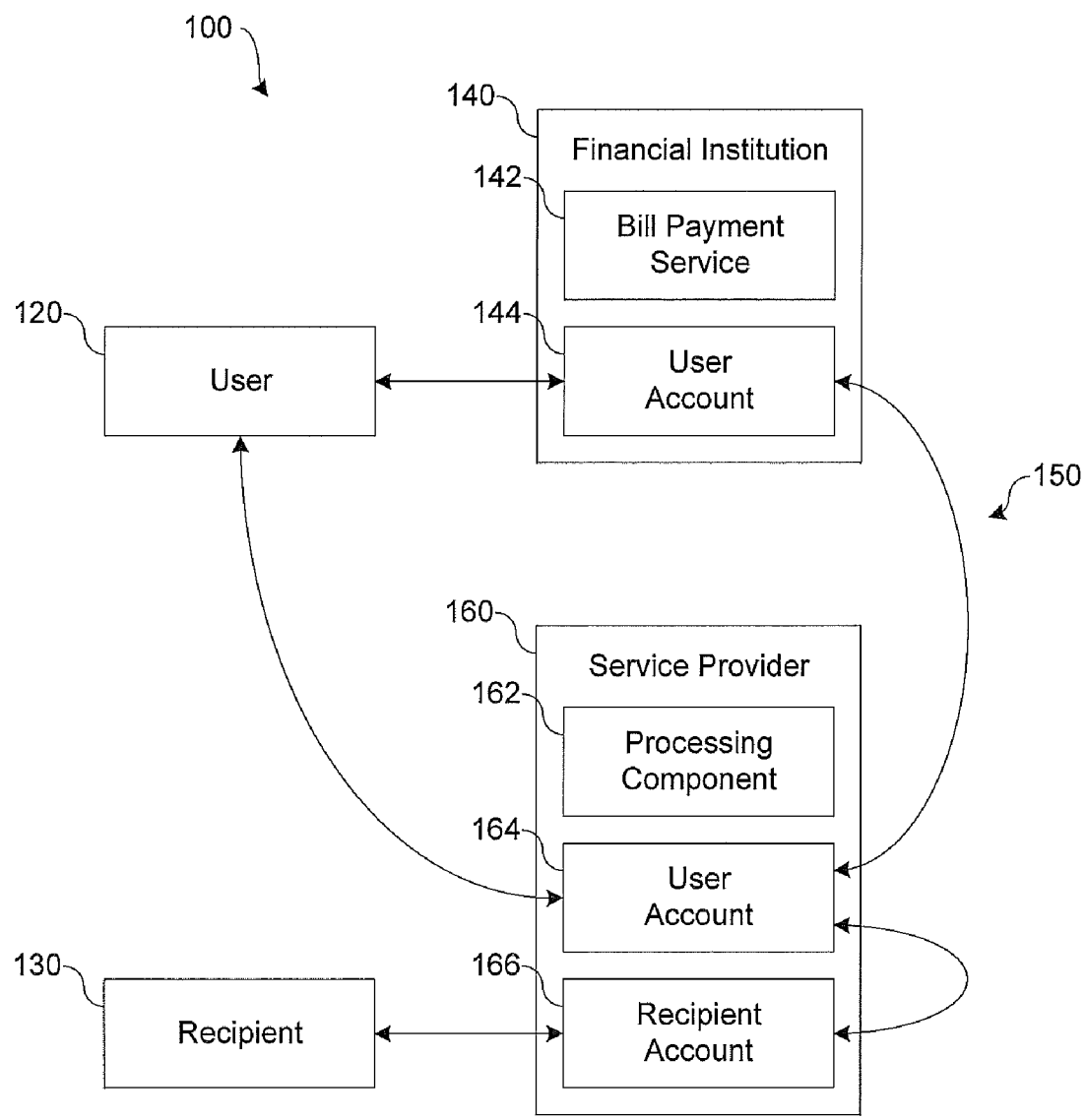
FIG. 1 shows a block diagram of a system adapted to facilitate fund transfers over a network, in accordance with an embodiment of the present disclosure.

Embodiments of the present disclosure and their advantages are best understood by referring to the detailed description that follows. It should be appreciated that like reference numerals are used to identify like elements illustrated, in one or more of the figures, wherein showings therein are for purposes of illustrating embodiments of the present disclosure and not for purposes of limiting the same.

DETAILED DESCRIPTION

FIG. 1 shows one embodiment of a system 100 for facilitating financial transactions including fund transfers over a network, such as the Internet. As shown in FIG. 1, the system 100 includes a user 120 (e.g., a client or customer) adapted to interface with a financial institution 140 (e.g., a bank or credit union) and a service provider 160 (e.g., a network based financial transaction service provider) over a network.

The user 120, in one embodiment, is able to establish a user account 144 with the financial institution 140, such as a bank, wherein the user 120 may deposit monetary funds in the user account 144. The financial institution 140 is adapted to provide the user 120 with access to the user account 144 and to a bill payment service 142 via the network. In one aspect, the user 120 may request network based transactions, such as fund transfers (e.g., deposits and/or debits) between accounts, over the network in a manner as described in greater detail herein. In another aspect, the financial institution 140 may provide the user 120 with some form of payment media, such as an electronic payment resource, that is linked to the user account 144. In this instance, the user 120 may utilize the payment media to access funds in the user account 144.

In one implementation, the user 120 may utilize the bill payment service 142 to transfer funds from the user account 144 of the financial institution to a user account 164 of the service provider 160 via the network. The bill payment service 142 is adapted to process the fund transfer between the user 120 and the service provider 160 via the network. In one aspect, the bill payment service 142 may communicate with a clearing house to debit the user account 144 of the financial institution 140 in accordance with an amount specific to the fund transfer and credit the user account 164 of the service provider 160 over the network.

The user 120, in one embodiment, is able to establish one or more user accounts (e.g., the user account 164) with the service provider 160, wherein the user 120 may deposit monetary funds in the user account 164 either directly or from the user account 144 of the financial institution 140. The service provider 160 is adapted to provide the user 120 with access to the user account 164 via the network. In one aspect, the service provider 160 may provide the user 120 with some form of electronic payment resource that is linked to the user account 164. As such, in this instance, the user 120 may utilize the electronic payment resource to access funds in the user account 164.

In one aspect, a link 150 may be established between the user account 144 of the financial institution 140 and one or more other accounts with other financial institutions and/or network based service providers, such as the service provider 160. For example, the user 120 may provide an e-mail address to the service provider 160 as a unique identifier (i.e., a user identity verifier) so that the link 150 may be established between the user account 144 of the financial institution 140 and the user account 164 of the service provider 160. Accordingly, an e-mail address may be utilized by the user 120 to establish the user account 164 with the service provider 160, wherein the link 150 between the user accounts 144, 164 is an e-mail address related to the user 120. After linking user accounts 144, 164 via, e.g., an e-mail address, fund transfers may be processed seamlessly between the user accounts 144, 164 of the financial institution 140 and the service provider 160, respectively. It should be appreciated that, in various embodiments, the unique identifier (i.e., the user identity verifier) may comprise an e-mail address, telephone number, and/or various other types of easily remembered addresses and/or numbers related to the user 120, without departing from the scope of the present disclosure.

In another aspect, for security concerns, additional security verification may be obtained by the service provider 160 to further verify the identity of the user 120 and provide further security for verifying the link between the two accounts. When the user accounts 144, 164 are considered linked, the user 120 is presumed to be the same person having permission to access both user accounts 144, 164. However, after a nominal fund transfer takes place, the user 120 may be prompted with an option to link the information related to the user accounts 144, 164, wherein the user 120 may be prompted by the service provider 160 to provide at least one of a full name, address, telephone number, date of birth, and at least part of a social security number to link the user accounts 144, 164. The user 120 may be prompted to verify random deposit information. For example, the service provider 160 may transfer nominal funds (e.g., a penny or a dollar) to the user account 144 with the financial institution 140, and the user 120 may be prompted to verify information related to the nominal fund transfer, such as the amount deposited into the user account 144 and when the deposit occurred. In another example, the user 120 may be prompted to login to the user account 144 after a nominal fund transfer has been completed by the service provider 160 to verify the nominal fund transfer.

In one embodiment, bank information related to the user 120 may be utilized to establish the user account 164 with the service provider 160. However, personal and/or banking information related to the user account 144 with the financial institution 140 should be protected until the service provider 160 verifies that the user 120 wants to share or link the bank information related to the user account 144 with the user account 164.

In one implementation, the user 120 may allow or grant permission to the service provider 160 to transfer funds from the user account 164 of the service provider 160 to another user account of the service provider 160, such as a recipient account 164 related to a recipient 130 (e.g., another user, client, or customer having a user account with the service provider 160). A processing component 162 of the service provider 160 is adapted to process the fund transfer between the user account 164 and the recipient account 166. In one aspect, the service provider 160 may directly transfer funds between the user account 164 and the recipient account 166. In this instance, the service provider 160 may directly debit the user account 164 and directly credit the recipient account 166 because both of the accounts 164, 166 are established with the service provider 160. In another aspect, the service provider may use a clearing house to debit the user account 164 in accordance with an amount specific to the fund transfer and credit the recipient account 166 over the network. In this instance, the service provider 160 may optionally process the fund transfer through a clearing house even though the accounts 164, 166 are established with the service provider 160.

In one embodiment, a clearing house (not shown) resolves financial transactions through validation, delivery, and settlement. As such, the clearing house may comprise an agency or institution having a system for settling indebtedness between members of that system through which accounts may be debited and/or credited of monetary funds.

In one embodiment, one or more fund transfers between the user 120, the recipient 130, the financial institution 140, and the service provider 160 may take place over the network, such as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) adapted to interface and communicate with other communication networks, such as the Internet. As such, in one aspect, the user 120, the recipient 130, the financial institution 140, and the service provider 160 may be associated with a particular link (e.g., a link, such as a URL (Uniform Resource Locator) to an IP (Internet Protocol) address).

The user 120, in one embodiment, may utilize a network interface device, such as a personal computer (i.e., PC), a wireless telephone (e.g., cellular phone), a personal digital assistant (i.e., PDA), a notebook computer, and/or various other generally known types of wired and/or wireless computing devices, to communicate and interface with the financial institution 140 and/or the service provider 160 to access respective user accounts 144, 164 via any appropriate combination of hardware and/or software configured for wired and/or wireless communication over the network. For instance, the user 120 may utilize a network interface application (e.g., a network browser application) to communicate and interface with the financial institution 140 and/or the service provider 160 to access user accounts 144, 164, respectively, via the network. As such, in one example, the user 120 may use a web browser to access the user accounts 144, 164 over the internet.

The user device, in various embodiments, may include other applications as may be desired in one or more embodiments of the present disclosure to provide additional features available to the user 120. In one example, these other applications may include security applications for implementing user-side security features, programmatic client applications for interlacing with appropriate application programming interfaces (APIs) over the network, and/or various other types of generally known programs and/or software applications. In still other examples, these other applications may interface with the network interface application for improved efficiency and convenience.

The user device, in one embodiment, may include at least one user identifier, which may be implemented, e.g., as operating system registry entries, cookies associated with the network interface application, identifiers associated with hardware of the user device, and/or various other appropriate identifiers. The user identifier may include one or more attributes and/or parameters associated with the user, such as personal information related to the user (e.g., one or more user names, passwords, photograph images, biometric ids, addresses, phone numbers, etc.) and banking information (e.g., one or more banking institutions, credit card issuers, user account numbers, security data and information, etc.). In various aspects, the user identifier may be passed with a login request and/or fund transfer request to the financial institution 140 and/or the service provider 160 via the network, and the user identifier may be used by the financial institution 140 and/or the service provider 160 to associate the user 120 with user accounts 144, 164, respectively.

In one embodiment, as with the user 120, the recipient 130 may utilize a network interface device, such as a PC, a wireless telephone, a PDA, a notebook computer, and/or various other generally known types of wired and/or wireless computing devices, to communicate and interface with the service provider 160 to access the recipient account 166 via any appropriate combination of hardware and/or software configured for wired and/or wireless communication over the network. For instance, the recipient 130 may utilize a network interface application to communicate and interlace with the service provider 160 to access the recipient account 166 via the network. As such, in this instance, the recipient 130 may use a web browser to access the recipient account 166 over the Internet. Even though not shown, it should be appreciated that the recipient 130 may have a recipient account with the financial institution 140, without departing from the scope of the present disclosure. As such, the recipient 130 would also be able to access a recipient account with the financial institution 140 over the network.

In one embodiment, the financial institution 140 and/or the service provider 160 may maintain one or more servers on the network for processing financial transactions including fund transfers over the network. In this instance, each of the one or more servers for the financial institution 140 and/or the service provider 160 may include one or more databases for storing information related to the bill payment service 142, the user accounts 144, 164, and the recipient account 166, respectively. Each of the one or more servers for the financial institution 140 and/or the service provider 160 may include some form of network interface application configured to provide access to the bill payment service 142, the user accounts 144, 164, and the recipient account 166, respectively; over the network to the user 120 and the recipient 130, respectively. For example, the user 120 may interact with the network interface application through a browser application over the network to access one or more of the user accounts 144, 164.

The service provider 160, in one embodiment, is adapted to process financial transitions including fund transfers over the network on behalf of the user 120 and/or the recipient 130. In this instance, the service provider 160 may utilize some form of fund transfer and settlement application configured to interact with the user 120 and/or the recipient 130 to facilitate fund transfers. In one example, the service provider 160 may be provided by PayPal, Inc. of San Jose, Calif., USA.

The service provider 160, in one embodiment, may be configured to maintain a plurality of accounts (e.g., user account 164 and recipient account 166), each of which may include account information associated with user 120 an/or the recipient 130. For example, account information may include private financial information of the user 120 and/or the recipient 130, such as one or more account numbers, passwords, credit card information, banking information, or other types of financial information, which may be used to facilitate financial transactions including fund transfers over the network. In various implementations, the system 100 described herein may be modified to accommodate users and/or recipients that may or may not be associated with at least one existing account, without departing from the scope of the present disclosure.

In one embodiment, the user 120 and/or the recipient 130 may have identity attributes stored with the financial institution 140 and/or the service provider 160, and the user 120 and/or the recipient 130 may have credentials to authenticate or verify identity with the financial institution 140 and/or the service provider 160. In one aspect, user attributes may include personal information and/or banking information, as previously described. In various aspects, the user attributes may be passed to the financial institution 140 and/or the service provider 160 as part of a login, account access request, fund transfer request, and/or payment request, and the user attributes may be utilized by the financial institution 140 and/or the service provider 160 to associate the user 120 and/or the recipient 130 with the user accounts 144, 164, respectively, which are maintained by the financial institution 140 and/or the service provider 160, respectively.

In one embodiment, the financial institution 140 and/or the service provider 160 may be associated with at least one identifier, which may be included as part of a financial transaction including a fund transfer. The identifier may include one or more attributes and/or parameters related to the financial institution 140 and/or the service provider 160, such as business and/or banking information. In one example, the identifier for the financial institution 140 may be passed to the service provider 160 when the user 120 requests a fund transfer from the financial institution 140 to the service provider 160. In this instance, the identifier may be used by the service provider 160 to identify and/or verify the user account 144 in reference to the financial institution 140.

In one embodiment, the processing component 162 of the service provider 160 may utilize a processing module to process fund transfers between accounts, such as the user accounts 144, 164 and the recipient account 166. In one implementation, the processing module is adapted to assist with resolving financial transactions including fund transfers through validation, delivery, and settlement. For example, the processing component 162 in conjunction with the processing module may be adapted to resolve fund transfers between the user 120 and the recipient 130, wherein the accounts 144, 164, 166 may be directly and/or automatically debited and/or credited of monetary funds in a manner as accepted by the banking industry.

Figure 2:
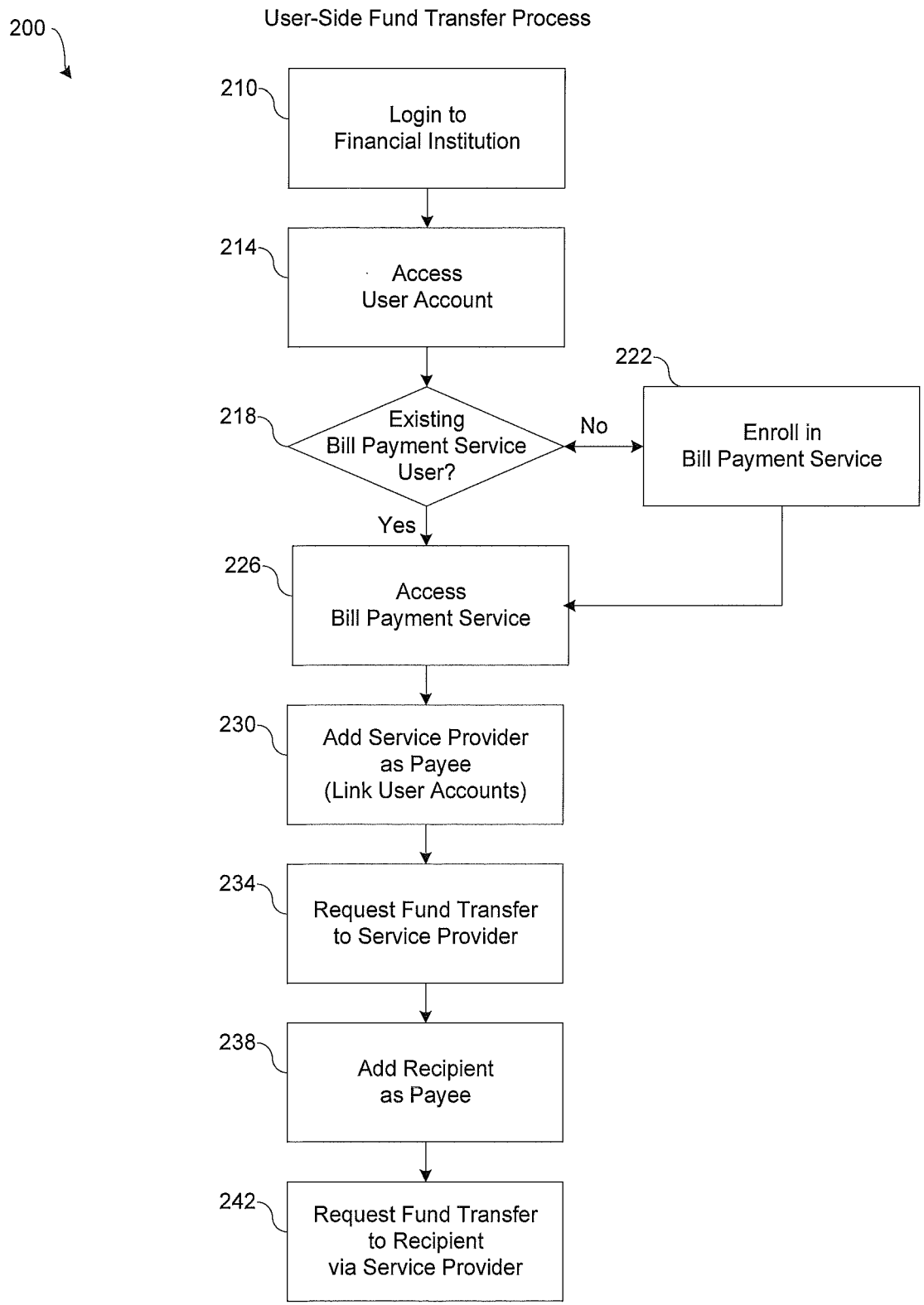
FIG. 2 shows one embodiment of a method for facilitating user-side fund transfers over a network, in accordance with an embodiment of the present disclosure.

FIG. 2 shows one embodiment of a method 200 for facilitating one or more user-side fund transfers over a network. The following description of FIG. 2 and the corresponding method 200 references the system 100 of FIG. 1. Referring to FIG. 5, the user 120 interfaces and communicates with the financial institution 140 and/or the service provider 160 via the network to request fund transfers from, e.g., the user account 144 of the financial institution 140 to the user account 164 of the service provider 160 and/or from, e.g., the user account 164 of the service provider 160 to the recipient account 166 of the service provider 160.

In one implementation, the method 200 provides a process of account verification by utilizing the bill payment service 142 (or some other similar service) of the user's financial institution 140, which simplifies account verification for the user while maintaining security and reliability. Referring to FIG. 2, the user 120 provides a login request to the financial institution 140 (block 210) to access the user account 144 (block 214). Then, when the user 120 attempts to access the bill payment service 142, the financial institution 140 determines (block 218) whether the user 120 is a current user of the bill payment service 142 by, e.g., verifying access privileges for the user 120 based on information stored with the user account 144. If the user 120 has been granted access privileges for the bill payment service 142, then the user 120 may proceed to access the bill payment service 142 (block 226). Otherwise, the user 120 may be prompted to enroll in the bill payment service 142 (block 222) to gain access privileges for the bill payment service 142 and then proceed to access the bill payment service 142 (block 226).

Once the user 120 is granted access to the bill payment service 142 of the user's financial institution 140 (block 226), the user 120 may add the service provider 160 as a biller or payee (block 230) to link 150 the user account 144 of the financial institution 140 to the user account 164 of the service provider 160.

As previously described, the link 150 may be established between the user account 144 of the financial institution 140 and the user account 164 of the service provider 160. In one aspect, the user 120 may provide an e-mail address to the service provider 160 as a user identity verifier so that the link 150 may be established between the user account 144 of the financial institution 140 and the user account 164 of the service provider 160. In one aspect, additional security verification may be obtained by the service provider 160 to further verify the identity of the user 120 and provide further security for verifying the link between the two accounts. The additional security verification is described in greater detail herein.

As such, in one embodiment, the link 150 between the user accounts 144, 164 is an e-mail address related to the user 120. Accordingly, an e-mail address may be utilized by the user 120 to establish the user account 164 with the service provider 160. After linking user accounts 144, 164 via, e.g., an e-mail address, fund transfers may be processed seamlessly between the user accounts 144, 164 of the financial institution 140 and the service provider 160, respectively.

Next, the user 120 may request a fund transfer from the user account 144 of the financial institution 140 to the user account 164 of the service provider 160 (block 234). In one implementation, the user 120 adds the payment service 120 as a payee by, e.g., entering user identity information, such as one or more of an e-mail address, payee name, and/or an account number. The user 120 then transfers a nominal amount, such as $1, to the service provider 360 through the bill payment service 142 and enters the user's identity information (e.g., an e-mail address of the user 120 for the service provider 160) in a memo field of the fund transfer request. The bill payment service 142 then transfers the requested funds to the service provider 160 by, e.g., sending an electronic check or a receipt of the electronic check to the service provider 160, which includes the user's account number and routing number associated with the user account 144 of the financial institution 140.

In one aspect, the electronic check or receipt of the electronic check may comprise an electronic document or a physical document. The service provider 160 may use information from the document, including a billing address, to verify and/or establish, the user's account 164 with the service provider 160. In one example, the service provider 160 may transfer the same funds or another amount of funds back to the user's financial institution 140. As such, in this instance, the user 120 may simply create and/or access the user account 164 with the service provider 160 by simply signing up the service provider 160 as payee through the bill payment service 142 of the financial institution 140 instead of providing specific account information including account numbers, checking deposits, etc.

In another aspect, additional security verification may be obtained by the service provider 160 to further verify the identity of the user 120 and provide further security for verifying the link between the two accounts. Using the bill payment service 142 to transfer funds from the user account 144 of the financial institution 140 to the user account 164 or recipient account 166 of the service provider 160 may be achieved with email account information related to the user 120. However, for security concerns, when the user accounts 144, 164 are considered linked, a presumption may be made that the user 120 is the same person having permission to access both user accounts 144, 164. Thus, in one embodiment, after an initial fund transfer takes place (block 234), the user 120 may be prompted with an option to link the information related to the user accounts 144, 164. Accordingly, the user 120 may be prompted by the service provider 160 to provide at least one of a full name, address, telephone number, date of birth, and at least part of a social security number to link the user accounts 144, 164. The user 120 may be prompted to verify random deposit information. For example, the service provider 160 may transfer random nominal funds (e.g., a random two-digit fund transfer, such as 34 cents or 78 cents) to the user account 144 with the financial institution 140, and the user 120 may be prompted to verify information related to the nominal fund transfer, such as the amount deposited into the user account 144 and when the deposit occurred.

In another example, the service provider 160 may prompt the user 120 to login to the user account 144 via the service provider server after a fund transfer has been completed to verify or validate the fund transfer. The service provider 160 would then review information in both user accounts 144, 164 to obtain and match information related to the fund transfer between the user accounts 144, 164. For example, the obtained and matched information may include the dollar amount, the date, the memo field (e.g., email address), and/or the actual transaction identification number for the fund transfer. In other words, the service provider 160 may review the fund transfer initiated by the user account 164 and prompt the user 120 to login to the user account 144 via the service provider 160 so that the service provider 160 may troll, (e.g., with or without user action) both user accounts 144, 164 to verify or validate information from the fund transfer between the user accounts 144, 164.

Accordingly, bank information related to the user 120 may be utilized to establish the secondary account (i.e., the user account 164) with the service provider 160. However, in one aspect, personal and/or banking information related to the first account (i.e., the user account 144) with the financial institution 140 should be protected until the service provider 160 verifies that the user 120 wants to share or link the bank information related to the first account (i.e., user account 144) with the secondary account (i.e., user account 164). In one aspect, a reason for the additional security verification is that, if funds are transferred to another person's account, (e.g., the recipient account 166 related to the recipient 130), through the bill payment service 142, any personal and/or banking information related to the user 120 should be protected from disclosure to the recipient 130.

Moreover, since the user 120 is granted access to the bill payment service 142 of the user's financial institution 140 (block 226), the user 120 may add the service provider 160 and the recipient 130 as a biller or payee (block 238). Next, the user 120 may request a fund transfer from the user account 144 of the financial institution 140 to the recipient account 166 of the service provider 160 (block 238). As such, in one implementation, the user 120 may transfer funds to the recipient account 166 if the recipient 130 has an existing recipient account 166 with the service provider 160. However, in another implementation, the user 120 may transfer funds to the recipient 130 via the service provider 160 even though the recipient 130 does not have an established account with the service provider 160. In this instance, when the recipient 130 attempts to access funds from the service provider 160, the service provider 160 may obtain identity information from the recipient 130 to create and/or establish an account for the recipient 130, such as the recipient account 166. Accordingly, the service provider 160 may simply add more users to its service roster. In one aspect, if a user (e.g., the user 120 and/or the recipient 130) has an established account, the method 200 achieves a person-to-person payment network with the service provider 160 and the bill payment service 142 of the financial institution 140 serving as intermediaries.

As described herein, the method 200 utilizes inherent features of an online banking account with the bill payment service 142 (or other similar service) such that information needed by the service provider 160 to verify an existing account or to create and verify a new account are automatically provided by the user 120 simply accessing the user's account 144 and the bill payment service 142 of the user's financial institution 140. In one aspect, since the electronic payment resource (e.g., an electronic check) from the bill payment service 142 includes user information (e.g., user name, billing address, account number, and routing number), a new account may be easily created by the user 120 simply by sending a small amount of monetary funds to the service provider 160 through the bill payment service 142 of the user's financial institution 140. Once an account is verified, the service provider 160 may send a message to an e-mail address related to the user 120 to inform the user 120 that the account (e.g., the user account 164) is active and accessible via the network.

Figure 3:
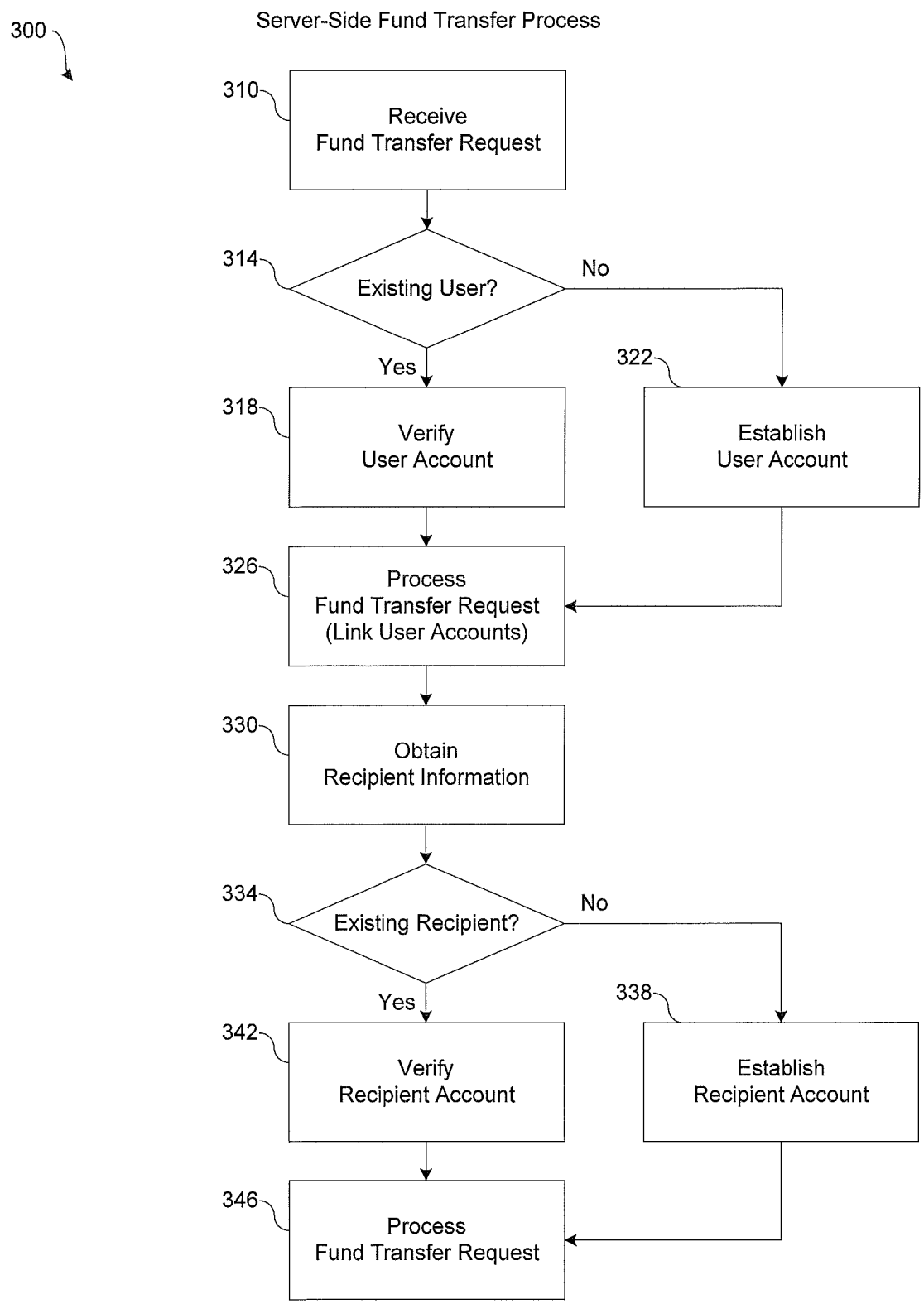
FIG. 3 shows one embodiment of a method for facilitating server-side processing of fund transfers over a network, in accordance with an embodiment of the present disclosure.

FIG. 3 shows one embodiment of a method 300 for facilitating one or more server-side fluid transfers over a network. The following description of FIG. 3 and corresponding method 300 references the system 100 of FIG. 1. Referring to FIG. 1, the service provider 160 interfaces and communicates with the user 120 and/or the financial institution 140 via the network to process fund transfers from, e.g., the user account 144 of the financial institution 140 to the user account 164 of the service provider 160 and/or from, e.g., the user account 164 of the service provider 160 to the recipient account 166 of the service provider 160.

In one implementation, the method 300 provides a process of account verification by utilizing the bill payment service 142 (or some other similar service) of the user's financial institution 140, which simplifies account verification for the user and the service provider 160 while maintaining security and reliability. Referring to FIG. 3, the service provider 160 receives a fund transfer request from the user 120 via the bill payment service 142 of the financial institution 140 (block 310).

In one embodiment, the service provider 160 is adapted to extract an e-mail address related to the user 120 from a memo field of the fond transfer request. The e-mail address may be utilized by the service provider 160 to establish and/or verify the user account 164 and/or to establish the link 150 between the user account 144 of the financial institution 140 and the user account 164 of the service provider 160. As such, in one aspect, the user 120 may provide an e-mail address to the service provider 160 in the fund transfer request as a user identity verifier to establish and/or verify the user account 164 and/or to establish the link 150 between the user accounts 144, 164 of the financial institution 140 and the service provider 160, respectively. Accordingly, an e-mail address related to the user 120 may be utilized by the service provider 160 to establish and/or verify the user account 164 with the service provider 160 and/or establish the link 150 between the user accounts 144, 164 of the financial institution 140 and the service provider 160, respectively. After linking the user accounts 144, 164 via, e.g., an e-mail address, fund transfers may be processed seamlessly between the user accounts 144, 164 of the financial institution 140 and the service provider 160, respectively. In accordance with one or more embodiments, the link 150 between the user accounts 144, 164 is an e-mail address related to the user 120.

It should be appreciated that, in various embodiments, the unique identifier (i.e., the user identity verifier) may comprise an e-mail address, telephone number, and/or various other types of easily remembered addresses and/or numbers related to the user 120, without departing from the scope of the present disclosure. It should also be appreciated that using an e-mail address and/or a telephone number related to the user 120 for account identity verification makes the matching and/or creation of another user account (i.e., the user account 164 with the service provider 160) much easier, simpler, and safer. As such, the service provider 160 is adapted to utilize the e-mail address and/or the telephone number related to the user 120 as an improved security measure to verify and/or establish one or more accounts related to the user 120.

Next, the service provider 160 determines (block 314) whether the user 120 is an existing user having an account with service provider 160 based on information passed with the fund transfer request, such as an e-mail address related to the user 120. Preferably, the service provider 160 utilizes an e-mail address related to the user 120 to determine if the user 120 has an existing account, such as the user account 164. If the user 120 has an existing or established account (e.g., the user account 164) with the service provider 160, then the service provider 160 verifies access privileges (block 318) for the user 120 based on information stored with the user account 164. Otherwise, the user 120 may be prompted to establish an account (block 322) with the service provider 160 to gain access to the user account 164. Preferably, the service provider 160 utilizes an e-mail address related to the user 120 to verify and/or establish the user account 164.

Once the user account 164 is verified and/or established, then the service provider 160 may process the fund transfer request (block 326). In one aspect, the service provider 160 may process the fund transfer request by, e.g., linking the user account 164 of the service provider 160 to the user account 144 of the financial institution 140. The link 150 facilitates seamless fund transfers between the user accounts 144, 164 of the financial institution 140 and the service provider 160, respectively. In one implementation, the service provider 160 may process a fund transfer request on behalf of the user 120 by, e.g., receiving funds from the user account 144 of the financial institution 140 and crediting the funds to the user account 164 of the service provider 160. As previously described in reference to method 200 of FIG. 2, the user 120 may add the payment service 120 as a payee by providing user identity information, such as an e-mail address, payee name, and/or an account number, to the bill payment service 142. As part of the fund transfer request, the service provider 160 may receive a nominal amount offends, such as $1, from the user's financial institution 140 through the bill payment service 142 and receive the user's identity information (e.g., an e-mail address of the user 120 related to the service provider 160) in a memo field of the fund transfer request. The service provider 160 may then receive the requested funds and then credit or deposit the received funds in the user account 164. In one example, the funds may be received in the form of an electronic check or a receipt of the electronic check, which may include the user's account number and routing number associated with the user account 144 of the financial institution 140.

In one aspect, as previously described, the electronic check or receipt of the electronic check may comprise an electronic or physical document. The service provider 160 may use information from the electronic or physical document, including a billing address of the user 120, to verify and/or establish the user's account 164. In one implementation, the service provider 160 may transfer the received funds or another amount of funds back to the user's account 144 with the financial institution 140. As such, in this instance, the service provider 160 may simply create and/or verify the user account 164 by simply reviewing information related to the user 120 provided as part of the fund transfer request from the bill payment service 142 of the financial institution 140.

In another aspect, additional security verification may be obtained by the service provider 160 to further verify the identity of the user 120 and provide further security for verifying the link between the two accounts. Using the bill payment service 142 to transfer funds from the user account 144 of the financial institution 140 to the user account 164 or recipient account 166 of the service provider 160 may be achieved with email account information related to the user 120. However, for security concerns, after an initial fund transfer takes place, the service provider 160 may prompt the user 120 with an option to link the information related to the user accounts 144, 164. Accordingly, the service provider 160 may prompt the user 120 to provide at least one of a full name, address, telephone number, date of birth, and at least part of a social security number to link the user accounts 144, 164. In addition, the user 120 may be prompted to verify random deposit information. For example, the service provider 160 may transfer random nominal funds e.g., a random two-digit fund transfer, such as 34 cents or 78 cents) to the user account 144 with the financial institution 140, and the user 120 may be prompted to verify information related to the nominal fund transfer, such as the amount deposited into the user account 144 and when the deposit occurred.

In another example, the service provider 160 may prompt the user 120 to login to the user account 144 via the service provider server after a fund transfer has been completed to verify or validate the fund transfer. The service provider 160 would then review information in both user accounts 144, 164 to obtain and match information related to the fund transfer between the user accounts 144, 164. For example, the obtained and matched information may include the dollar amount, the date, the memo field (e.g., email address), and/or the actual transaction identification number for the fund transfer. In other words, the service provider 160 may review the fund transfer initiated by the user account 164 and prompt the user 120 to login to the user account 144 via the service provider 160 so that the service provider 160 may troll (e.g., with or without user knowledge) both user accounts 144, 164 to verify or validate information from the fund transfer between the user accounts 144, 164.

Accordingly, bank information related to the user 120 may be utilized to establish the secondary account (i.e., the user account 164) with the service provider 160. However, in one aspect, personal and/or banking information related to the first account (i.e., the user account 144) with the financial institution 140 should be protected until the service provider 160 verifies that the user 120 wants to share or link the bank information related to the first account (i.e., user account 144) with the secondary account (i.e., user account 164). In one aspect, a reason for the additional security verification is that, if funds are transferred to another person's account, (e.g., the recipient account 166 related to the recipient 130), through the bill payment service 142, any personal and/or banking information related to the user 120 should be protected from disclosure to the recipient 130.

Next, the service provider 160 may obtain recipient information from the fund transfer request (block 330) as provided by the user 120. Then, the service provider 160 determines (block 334) whether the recipient 130 is an existing user/recipient having an account (e.g., the recipient account 166) with service provider 160 based on information passed with the fund transfer request. If the recipient 130 has an established account (e.g., the recipient account 166) with the service provider 160, then the service provider 160 verifies the recipient account 166 (block 342) for the recipient 130 based on information stored with the recipient account 164. Otherwise, the service provider 160 may establish an account (block 338) for the recipient 130 on behalf of the user 120 even though the recipient 130 does not have an existing account.

Once the recipient account 166 is verified and/or established, then the service provider 160 may process the fund transfer request (block 346). In one implementation, the service provider 160 may process a fund transfer request on behalf of the user 120 by, e.g., receiving funds from the user account 144 of the financial institution 140 and crediting the funds to the recipient account 166 of the service provider 160. In another implementation, the service provider 160 may process a fund transfer request on behalf of the user 120 by, e.g., debiting funds from the user account 164 of the service provider 160 and crediting the funds to the recipient account 166 of the service provider 160.

As previously described in reference to method 200 of FIG. 2, the user 120 may add the service provider 160 and the recipient 130 as a payee. As such, the user 120 may request a fund transfer from the user account 144 of the financial institution 140 to the recipient account 166 of the service provider 160. The user 120 may transfer funds to the recipient account 166 if the recipient 130 has an existing recipient account 166 with the service provider 160. The user 120 may transfer funds to the recipient 130 via the service provider 160 even though the recipient 130 does not have an established account with the service provider 160. In this instance, when the recipient 130 attempts to access funds from the service provider 160, the service provider 160 may obtain identity information from the recipient 130 to grant the recipient 130 access to the recipient account 166. Accordingly, the service provider 160 may simply add more users including the recipient 130 to its service roster. In one aspect, the method 300 achieves a person-to-person payment network with the service provider 160 and the bill payment service 142 of the financial institution 140 serving as intermediaries.

As described herein, the method 300 utilizes inherent features of an online banking account with the bill payment service 142 (or other similar service) such that the service provider 160 automatically utilizes information passed with a fund transfer request to verify an existing account or to create and verify a new account. In one aspect, since the electronic payment resource (e.g., an electronic check) from the bill payment service 142 includes recipient information (e.g., recipient name, billing address, account number, and routing number), a new account for the recipient 130 may be created by the service provider 160 simply by utilizing the recipient information passed with the fund transfer request. As such, funds may be deposited in the recipient account 166 by the service provider 160 on behalf of the user 120. Once an account, is verified, the service provider 160 may send a message to an e-mail address related to the user 120 to inform the user 120 that the recipient account 166 is active and the fund transfer has been processed.

Figure 4:
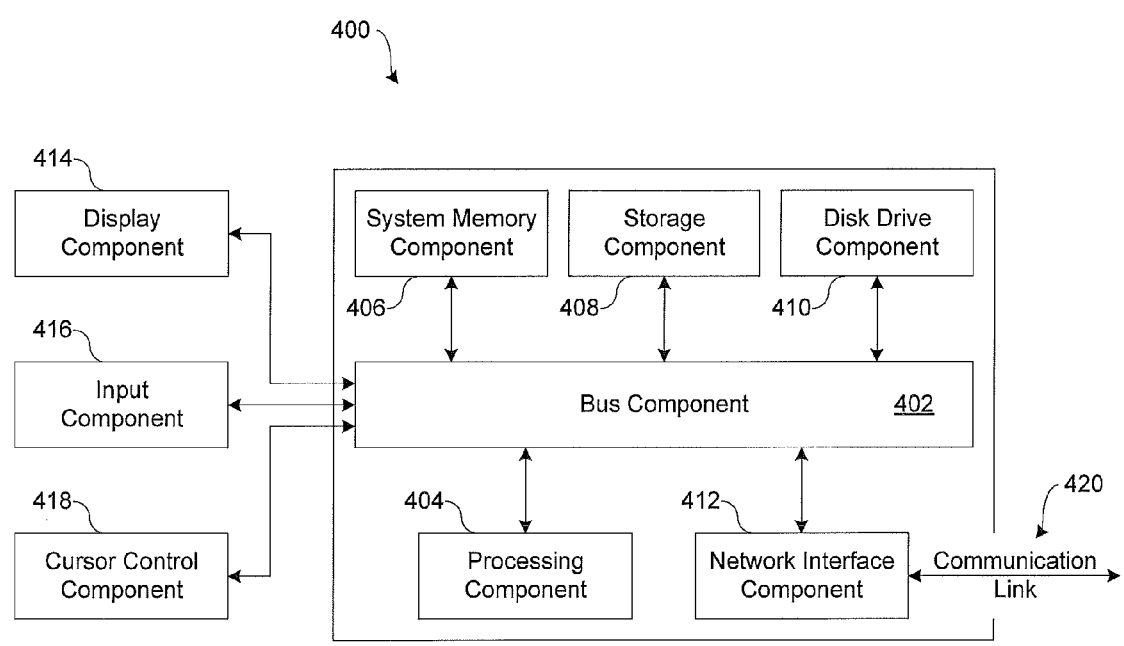
FIG. 4 is a block diagram of a computer system suitable for implementing one or more embodiments of the present disclosure.

FIG. 4 is a block diagram of a computer system 400 suitable for implementing one or more embodiments of the present disclosure. In various implementations, the user device may comprise a personal computing device (e.g., a personal computer, laptop, cell phone, PDA, etc.) capable of communicating with the network, the financial institution 140 may utilize a network computing device (e.g., a network server) capable of communicating with the network, and the service provider 160 may utilize a network computing device (e.g., a network server) capable of communicating with the network. It should be appreciated that each of the devices utilized by the user 120, the financial institution 140, and the service provider 160 may be implemented as computer system 400 in a manner as follows.

In accordance with various embodiments of the present disclosure, computer system 400, such as a personal computer and/or a network server, includes a bus 402 or other communication mechanism for communicating information, which interconnects subsystems and components, such as processing component 404 (e.g., processor, micro-controller, digital signal processor (DSP), etc.), system memory component 406 (e.g., RAM), static storage component 408 (e.g., ROM), disk drive component 410 (e.g., magnetic or optical), network interface component 412 (e.g., modem or Ethernet card), display component 414 (e.g., CRT or LCD), input component 416 (e.g., keyboard), and cursor control component 418 (e.g., mouse or trackball). In one implementation, disk drive component 410 may comprise a database having one or more disk drive components.

In accordance with embodiments of the present disclosure, computer system 400 performs specific operations by processor 404 executing one or more sequences of one or more instructions contained in system memory component 406. Such instructions may be read into system memory component 406 from another computer readable medium, such as static storage component 408 or disk drive component 410. In other embodiments, hard-wired circuitry may be used in place of or in combination with, software instructions to implement the present disclosure.

Logic may be encoded in a computer readable medium, which may refer to any medium that participates in providing instructions to processor 404 for execution. Such a medium may take many forms, including but not limited to, non-volatile media, volatile media, and transmission media. In various implementations, non-volatile media includes optical or magnetic disks, such as disk drive component 410, volatile media includes dynamic memory, such as system memory component 406, and transmission media includes coaxial cables, copper wire, and fiber optics, including wires that comprise bus 402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by the computer system 400. In various other embodiments of the present disclosure, a plurality of computer systems 400 coupled by communication link 420 to the network (e.g., such as a LAN, WLAN, PTSN, and/or various other wired or wireless networks, including telecommunications, mobile, and cellular phone networks) may perform instruction sequences to practice the present disclosure in coordination with one another.

Computer system 400 may transmit and receive messages, data, information and instructions, including one or more programs (i.e., application code) through communication link 420 and communication interface 412. Received program code may be executed by processor 404 as received and/or stored in disk drive component 410 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for facilitating financial transactions over a network, the method comprising:
   receiving by a network server of a service provider a fund transfer request over the network from a financial institution on behalf of a user, wherein the financial institution has a first user account for the user;
   determining whether the user has an existing account with the service provider based on user information passed with the fund transfer request;
   based on whether the user has an existing account with the service provider, establishing by the network server a second user account for the user with the service provider by automatically using the user information passed with the fund transfer request only; and
   processing by the network server the fund transfer request by receiving funds from the financial institution associated with the first user account and depositing the received funds in the second user account on behalf of the user.

2. The method of claim 1, wherein processing the fund transfer request comprises linking the first user account to the second user account based on the user information passed with the fund transfer request, and wherein the user information includes an e-mail address related to the user.

3. The method of claim 1, further comprising storing the user information for the second user account.

4. The method of claim 1, further comprising:
   obtaining by the network server recipient information of a recipient from the fund transfer request as provided by the user;
   determining whether the recipient has an existing account with the service provider based on the recipient information;
   based on whether the recipient has an existing account with the service provider, establishing a recipient account for the recipient with the service provider by automatically using the recipient information passed with the fund transfer request only; and
   processing the fund transfer request by receiving funds from the financial institution associated with the first user account and depositing the received funds in the recipient account on behalf of the recipient.

5. The method of claim 4, further comprising storing the recipient information for the recipient account.

6. The method of claim 1, further comprising the network server communicating with a bill payment service associated with the financial institution.

7. The method of claim 6, wherein receiving the fund transfer request from the financial institution comprises receiving the fund transfer request from the bill payment service on behalf of the user.

8. The method of claim 1, wherein the financial institution comprises a server adapted to communicate with the network.

9. A system for facilitating financial transactions over a network, the system comprising:
   a network interface of a service provider configured to communicate with a financial institution over the network, wherein the financial institution comprises a first user account for a user;
   a memory configured to store a plurality of machine-readable instructions; and
   a processor configured to execute the machine-readable instructions to receive a fund transfer request from the financial institution on behalf of the user, determine whether the user has an existing account with the service provider based on user information passed with the fund transfer request, based on whether the user has an existing account with the service provider establish a second user account for the user with the service provider by automatically using the user information passed with the fund transfer request only, and process the fund transfer request by receiving funds from the financial institution associated with the first user account and depositing the received funds in the second user account on behalf of the user.

10. The system of claim 9, wherein the processor is further configured to process the fund transfer request by linking the first user account to the second user account based on the user information passed with the fund transfer request, and wherein the user information includes an e-mail address related to the user.

11. The system of claim 9, further comprising a storage component configured to store the user information for the second user account.

12. The system of claim 9, wherein the processor is further configured to obtain recipient information of a recipient from the fund transfer request as provided by the user, determine whether the recipient has an existing account with the service provider based on the recipient information passed with the fund transfer request, based on whether the recipient has an existing account with the service provider establish a recipient account for the recipient with the service provider automatically based on the recipient information passed with the fund transfer request only, and process the fund transfer request by receiving funds from the financial institution associated with the first user account and depositing the received funds in the recipient account on behalf of the recipient.

13. The system of claim 12, further comprising a storage component configured to store the recipient information for the recipient account.

14. The system of claim 9, wherein the network interface is further configured to communicate with a bill payment service associated with the financial institution over the network, and wherein the processor is further configured to receive the fund transfer request from the bill payment service on behalf of the user.

15. The system of claim 9, wherein the financial institution comprises a server configured to communicate with the network.

16. A non-transitory computer readable medium having computer readable code for instructing a processor to perform a method to facilitate financial transactions over a network, the method comprising:

- communicating with a financial institution over the network, the financial institution having a first user account for a user;
- receiving a fund transfer request from the financial institution on behalf of the user;
- determining whether the user has an existing account with a service provider based on user information passed with the fund transfer request;
- based on whether the user has an existing account with the service provider, establishing a second user account for the user with the service provider by automatically using the user information passed with the fund transfer request only;
- processing the fund transfer request by receiving funds from the financial institution associated with the first user account and depositing the received funds in the second user account on behalf of the user.

17. The non-transitory computer readable medium of claim 16, further comprising instructing the processor to process the fund transfer request by linking the first user account to the second user account based on the user information passed with the fund transfer request, wherein the user information includes an e-mail address related to the user.

* * * * *